June 3, 1958 D. P. GRAHAM Re. 24,479

ROTARY MINING MACHINE HEAD AND CUTTER CARRIED THEREBY MOVABLE IN ELLIPTICAL PATHS

Original Filed May 24, 1950 4 Sheets-Sheet 1

INVENTOR.
D. P. Graham
BY
W. J. McDowell
ATTORNEY

June 3, 1958 D. P. GRAHAM Re. 24,479

ROTARY MINING MACHINE HEAD AND CUTTER CARRIED THEREBY MOVABLE IN ELLIPTICAL PATHS

Original Filed May 24, 1950 4 Sheets-Sheet 2

INVENTOR.
D. P. Graham
BY
W. S. McDowell
ATTORNEY

INVENTOR
D. P. Graham
BY W. S. McDowell
ATTORNEY

INVENTOR.
D. P. Graham
BY
W. S. McDowell
ATTORNEY

United States Patent Office

Re. 24,479
Reissued June 3, 1958

24,479

ROTARY MINING MACHINE HEAD AND CUTTER CARRIED THEREBY MOVABLE IN ELLIPTICAL PATHS

Dallas P. Graham, Homewood, Ill., assignor, by mesne assignments, to Joy Manufacturing Company, Pittsburgh, Pa., a corporation of Pennsylvania Original No. 2,694,563, dated November 16, 1954, Serial No. 163,911, May 24, 1950. Application for reissue December 6, 1955, Serial No. 551,483

19 Claims. (Cl. 262—7)

Matter enclosed in heavy brackets [ ] appears in the original patent but forms no part of this reissue specification; matter printed in italics indicates the additions made by reissue.

This invention relates to mining machines and more particularly to portable mining machines of the continuous type which are employed, for example, in cutting coal seams to produce and remove from such seams loosened bodies of coal. In such machines, the loosened bodies of coal, following removal, are deposited on conveying means forming a part of the machine and conducted thereby to mine cars or other carriers for removal from a mine.

Machines of this type directly attack coal or other minerals present in a seam undergoing working, and are so constructed as to dispense with the need of explosives in loosening the coal from its natural bed or seam and reduce the same to a size enabling the loading thereof in mine cars. Prior mining machines for this purpose have employed power-driven rotatable cutter-carrying heads mounted to turn about horizontal axes in parallel order to the vertical working face of the seam being mined. As a result, the radii of such heads have been restricted to conform with the height or thickness of the coal seam.

In the mining of coal, it is common to provide working rooms or passages which are substantially rectangular in vertical cross section, having vertical side walls and a horizontal floor and roof. Rooms or passages which are substantially circular in transverse cross section, after the manner of a tunnel, are impracticable, since floor laid tracks and other mechanical equipment are used in such rooms or passages, necessitating room width and height. These conditions are such that when continuous mining machines are provided with rotary cutting heads, a plurality of such heads arranged in transversely spaced horizontally disposed order are provided, with the cutting orbits of such heads arranged to overlap. Under these conditions, the width of a room or passage cut by the machine in the coal seam is wider than when a single head is used, but the circularly moving cutters, turning about horizontal axes, leave coal fillets or cusps in the roof, floor or side walls of the seam penetrated by the mining machine. To remove these fillets or cusps often requires slow and costly manually performed operations in enabling the room or passage to possess required dimensions and for equipment installation and manipulation.

The use of chain-mounted cutters has also been proposed for removing these formations in producing flat, planar side, roof and bottom walls. Chain cutters, however, are objectionable in that they produce, as a result of their cutting action, a relatively large amount of fine coal and dust. In addition, such chain cutters add mechanical complications to mining machines of this character.

Accordingly, it is an object of the present invention to provide a continuous mining and loading machine wherein the cutters of the movable heads, instead of moving in circular paths, as heretofore, are so mounted as to travel in elongated eliptic orbits of movement, whereby to increase the width of a room or passage cut by the machine in a coal seam over that produced by an equivalent number of circularly traveling cutters, to render the room or passage substantially more rectangular in its transverse configuration, and to reduce substantially the amount of manual work or machinery necessary in removing fillets or cusps in adapting the floor of the room or passage for the laying of track and the handling of portable mining equipment.

A further object of the invention is to provide means for bodily raising and lowering and adjusting laterally the cutter heads of such a machine in adapting said heads to coal seams of varying thicknesses.

In accordance with the present invention, a continuous mining and loading machine of the character indicated is provided wherein the machine includes a head revolved by internal power-driven gearing about a fixed frame-carried axis, and wherein the head includes a shaft eccentrically disposed with respect to the axis of rotation of the head, the outer end of the shaft carrying for rotation in unison therewith a cutter-equipped spider member, planetary gearing being provided between the fixed axis of turning movement of said head and the shaft of said spider member, whereby to provide elliptic motion on the part of said spider member and the cutter elements carried thereby during rotation of said head.

Further, my improved mining machine involves a frame on the forward end of which the cutting heads are rotatably mounted for movement in elliptic paths and adapted for vertical adjustment, whereby to directly attack a coal seam and produce therefrom loosened and free bodies of coal which are deposited on an inclined apron carried by the front end of the machine frame, and wherein the upper surface of the apron at the opposite sides of a loading conveyor carried thereby with power-driven orbitally moving gathering arms traveling in elliptic paths and adapted for directing and depositing the loosened bodies of coal upon said conveyor.

Other objects of my invention are: to provide an essentially simple yet efficient machine for the purposes stated in which the elliptically traveling cutter heads of the machine are so formed as to produce but a minimum of coal dust or fines in the operation thereof, so that the coal mined by the machine will be characterized by the lumps or bodies of comparatively large size which the coal contains and its relative freedom from low value fine sizes; to produce a mining machine which in its operation at the working face of a mine, and in the confined rooms or passages in which the machine is required to function, maintains a working atmosphere devoid of the clouds of coal dust, which are characteristic of prior machines in their normal operation and to provide a continuous mining machine of simplified design which is capable of being readily controlled and efficiently operated by a small number of attendants.

For a further and more complete understanding of additional objects and advantages of the invention, reference is to be had to the following description and the accompanying drawings, which set forth in detail one of the preferred embodiments of the present invention.

Figure 7:
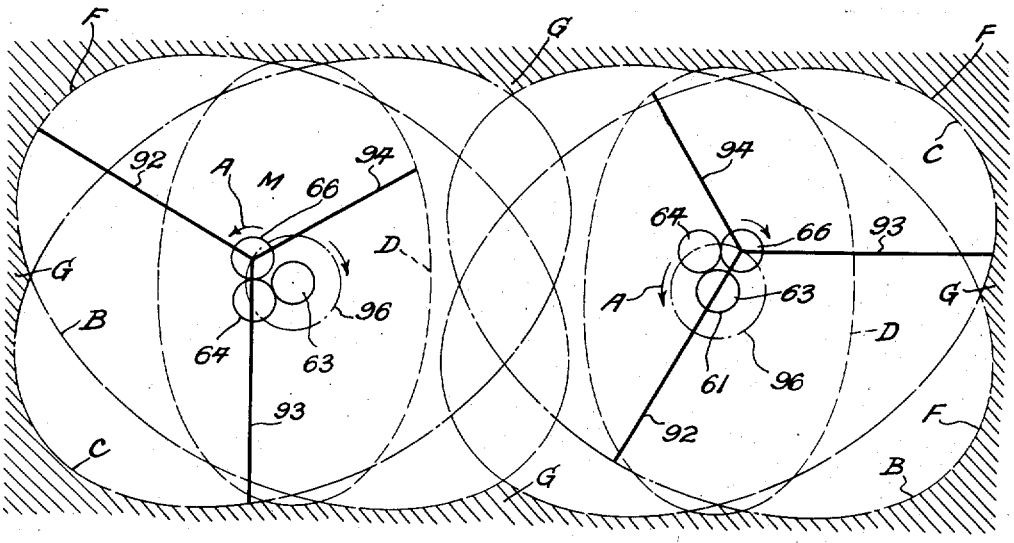
Figure 8:
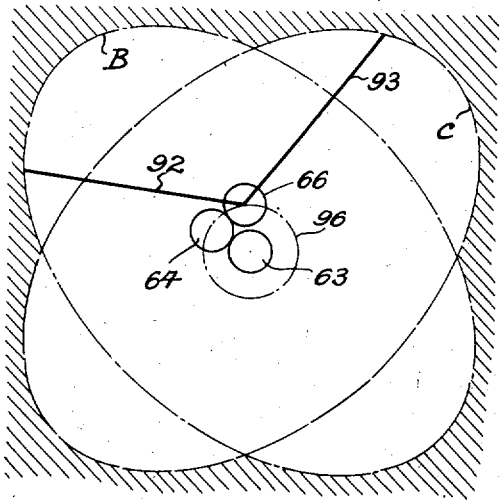
Figure 9:
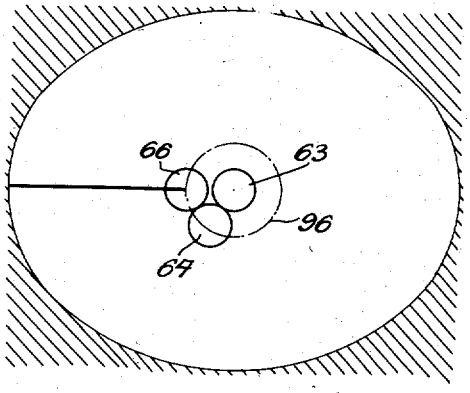

Fig. 7 is a diagrammatic view disclosing the orbital paths of travel of the cutters provided on a pair of cutter heads formed in accordance with the present invention, and wherein each head includes three cutters, two of which follow paths of travel overlapping those of similar cutters on an adjacent head, the figure illustrating the generally rectangular configuration of the room or passage formed in the material being mined by the machine of the present invention;

Fig. 8 is a similar view disclosing diagrammatically the cutting pattern of a single cutting head having a pair of cutters;

Fig. 9 is a similar view disclosing the pattern produced by a single cutter.

Referring to the drawings, and to the preferred specific embodiments of the invention herein selected for illustration and detailed description, the numeral 10 designates the frame structure of the machine in its entirety. In this instance, the frame structure has been shown as being portably mounted through the use of endless power-driven traction belts 11, although it is within the scope of the invention to support the frame structure by other conventional means if it should be so desired.

At its front, the frame structure is formed to provide an inclined gathering apron 12 and in the center of this apron, there is located the forward end of a longitudinally extending centrally disposed material-conveying trough 13. In the trough, there is mounted a conveyor which has been shown as comprising a centrally situated endless chain 14 carrying laterally projecting and longitudinally spaced flights 15. By means of this conveyor, loose materials deposited on the apron and positioned in the forward lower end of the trough are contacted by the flights 15 and positively advanced longitudinally and rearwardly of the trough.

Preferably, at its end, the trough includes a laterally swinging discharge extension 16 for the purpose of providing flexibility in the position of discharge of the mined materials from the rear end of the machine. Such discharge may be made in a manner so that the material will be deposited in mine cars, conveyors or the like, for transportation from the mine. Any suitable motor arrangement and associated power-transmission means may be provided for driving the traction belts 11 and the chain conveyor 14.

The present invention is concerned particularly with the front or cutting end of the machine. In this regard, use is made of a cutting mechanism M which, advantageously, may be formed to include a vertically disposed transversely extending base plate 17, the latter carrying spaced stationary gear housing base sections 18. Carried by the frame structure 10 midway of the length thereof and disposed at each side of the trough 13 is a pair of motors 19, usually electrically operated, although these motors may be of the fluid-pressure operated type, if necessary. The armature or operating shaft of each of these motors drives slidable telescopic shaft sections 20, which extend longitudinally forwardly from the motors 19 to the base plate 17 at each side of the trough 13. The ends of the shaft sections 20 are equipped with universal joints shown at 21 in adapting the shafts to the vertical adjustment, hereinafter described, of the plate 17 and the cutting mechanism carried thereby.

In obtaining such vertical adjustment on the part of said plate and cutting mechanism, pivoted sets of transversely spaced longitudinally extending lever arms 22 are utilized. These arms have their rear ends pivoted as at 23 in vertically registering order to the frame structure 10 and their front ends likewise pivotally connected as at 24 to ears 25 projecting from the rear face of the base plate 17. The arms 22 may be raised or lowered by means of the fluid-actuated jacks 26 which are pivotally connected at their lower ends to the frames 10 and at their upper ends to the arms 22. Any other equivalent means for raising and lowering the head cutters may, of course, be used.

The stationary base section 18 of each of the gear housings carries a fixed center spindle *or stud* 27 which normally is disposed horizontally in a forwardly projecting position. Revoluble about the fixed axis formed by each of these spindles is a rotatable head 28 which constitutes the movable section of the housing.

In the rotatable support of each of the heads 28, the relatively enlarged base end of each of the spindles 27 carries an antifriction thrust bearing 29 which includes an inner race member 30 arranged on and surrounding the spindle, an outer race member 31, and tapered intervening rollers 32, the outer race members 31 being secured to inwardly disposed annular faces formed on the hollow spindle hub 33 of each head 28. To further support the head for rotation on each of the spindles, intermediate antifriction bearings are used. Each of these intermediate bearings which are smaller in diameter than the first-named bearings as produced by the frustoconical section 35 of each spindle *or stud* 27, includes an inner race 34 seated on the outer end of said frustoconical section and an outer race 36 between which races tapered rollers 37 are arranged.

The extreme outer end of each of the spindles *or studs* 27 terminates in a cylindric extension 38 of reduced diameter which receives a plain roller-type antifriction bearing 39, the head rotating about the bearings 29, 34 and 39 in a manner concentric to the axis of the associated spindle 27.

Each head includes separable inner and outer sections 40 and 41, respectively, which are joined together by bolts or other equivalent fastening devices 42. The outer section carries a cap plate 43 which is bolted or otherwise fastened as at 44 to said outer section.

Rotatably mounted in antifriction bearings shown at 45 provided in the base section 18 and bearings indicated at 46 situated in the base plate 17 is a rotatable shaft 47. One end of this shaft has fixed thereto a gear 48 which is suitably driven by an associated telescopic shaft section 20, the gear 48 being disposed in a pocket 49 provided in the plate 17. The shaft 47 projects into an internal annular chamber 50 formed in the inner ring section 40 of the head housing. Within said chamber, the outer end of the shaft 47 is provided with gear teeth 51, which mesh with annular internally arranged gear teeth 52 provided internally of the housing ring 40, whereby to effect rotation of the composite housing heads 28 about the axis of the stationary spindle 27 of each head. The outer end of each of the shafts 47 is reduced in diameter as at 53 and is arranged for rotation in bearings 54 carried by the stationary base sections 18, the bearings 54 projecting through the inner open side of each chamber 50. Each of the base sections 18 includes an outer annular flange 55 having in connection therewith oil-retaining and dust-excluding rings 56, the inner surfaces of said rings, which are of yieldable composition, engage with the outer surfaces of annular flanges 57 which are formed with the inner sections 40 of said heads, the gear teeth 52 being formed on the inner surfaces of the flanges 57.

Figure 1:
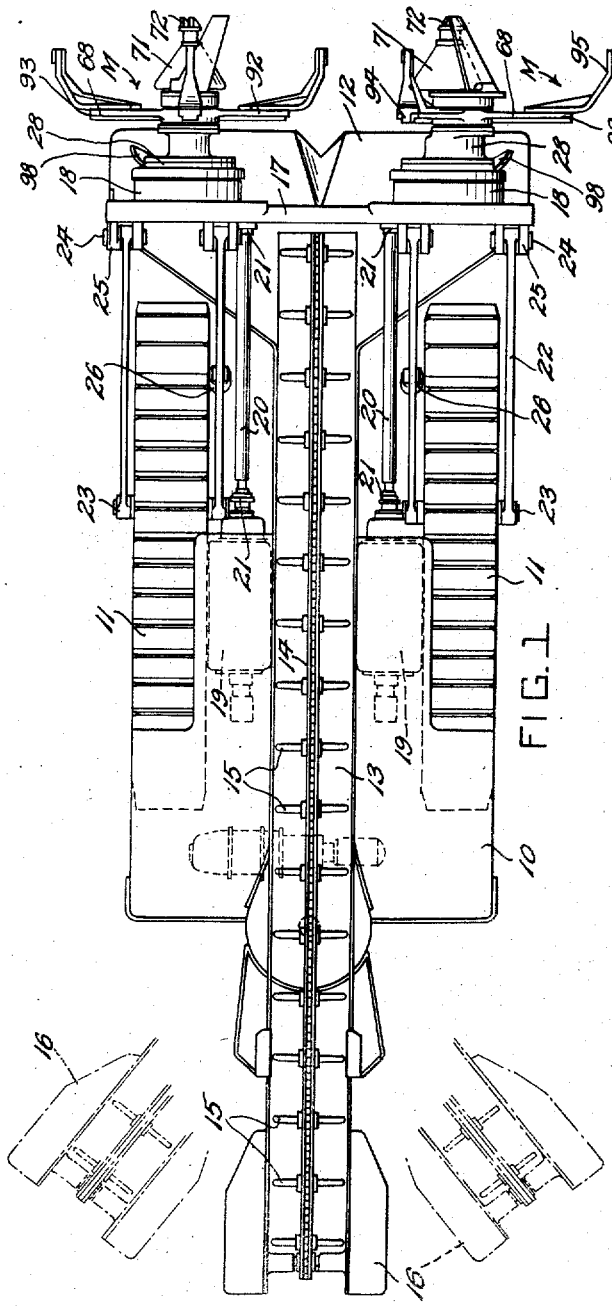
Fig. 1 is a top plan view of a continuous mining and loading machine formed in accordance with the present invention.
Figure 2:
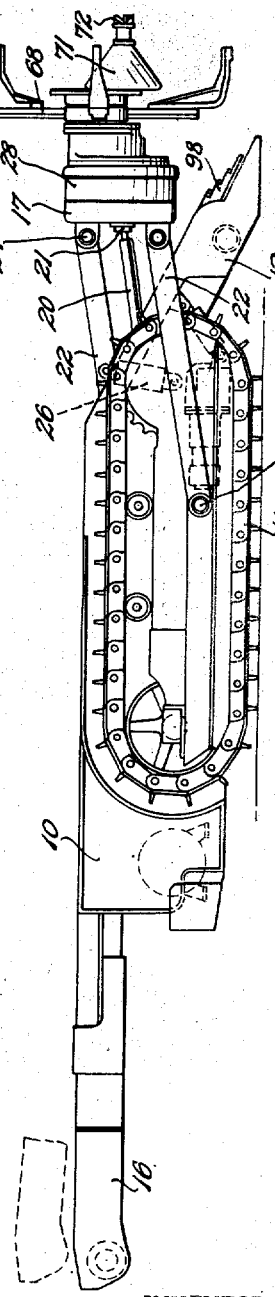
Fig. 2 is a side elevational view of the machine.
Figure 3:
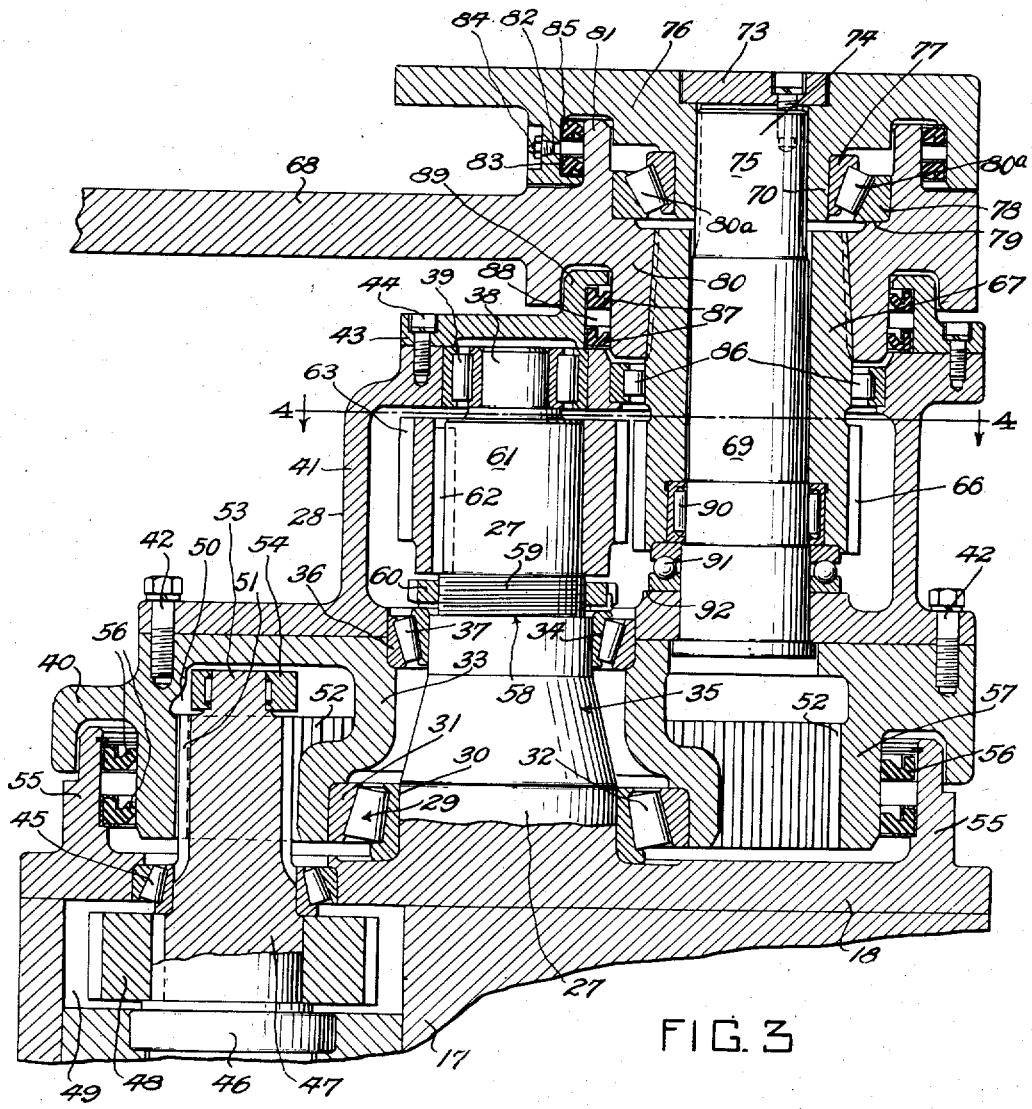
Fig. 3 is a horizontal sectional view taken through one of the cutter heads of the machine and disclosing more particularly the drive gearing provided therein.
Figure 4:
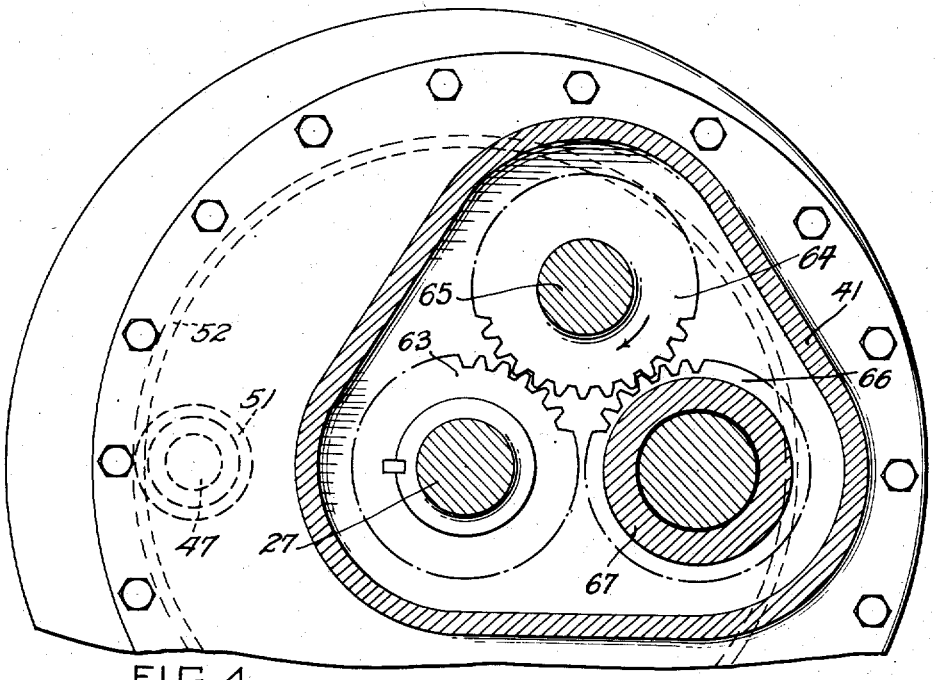
Fig. 4 is a vertical transverse sectional view taken through a cutter head on the plane indicated by the line 4—4 of Fig. 3.

Each of the spindles 27 is shouldered as at 58 and threaded as at 59 for the reception of a clamping nut 60 which holds the inner race 34 of the intermediate antifriction bearing on each of the spindles against longitudinal displacement. Beyond the threaded region 59, each spindle includes a stationary cylindric section 61 on which is positioned and keyed as at 62 a sun gear 63. Engaged with the teeth of the sun gear is a planetary gear 64, shown in Fig. 4, the latter being mounted on a shaft 65 carried by the outer section 41 of each head housing. The teeth of the planetary gear mesh with those of a gear 66 which are formed upon the inner end of a tubular hub *or quill* 67 of a cutter-carrying spider member 68.

It will be seen that as the housing heads rotate about the longitudinal axes of their spindles 61, as a result of the driving action obtained by the shaft 47, gear teeth 51 and the internal gear teeth 52 of the housing ring 40, rotary motion will be imparted to the idler or planetary gear 64 as a result of the constant meshing engagement thereof which the teeth possess with those of the gear 63 on the spindle 61. The rotation of the planetary gear, while revolving around its own axis as provided by the shaft 65, as well as its orbit of circular travel around the longitudinal axis of the spindle 27, produces rotation on the part of the hub 67 and the cutter carrying spider member 68. The rotation of the housing section of the head, which acts as a crank, through the planetary gearing shown, produces rotation of the cutter arms in an opposite or reverse direction. *Thus as the heads revolve about their axes in one direction the cutters revolve about their own axes in the opposite direction thereby to cause the cutters to trace elliptical patterns.*

Positioned in the hollow center of the hub 67 is a shaft 69, the outer end of which receives and has keyed or otherwise fixed thereto the hub 70 of a break-out cone and center drill shown at 71 and 72, respectively. The hub 70 is further held in place by a disk 73 seated in a socket 74, and a screw bolt 75 has its threaded shank positioned in a threaded opening formed longitudinally in the outer end of the shaft 67 holding the body 76 of the cone and drill in connection with the outer end of the shaft 69. The hub 70 carries the inner race 77 of an antifriction thrust-receiving bearing. The outer race 78 of this bearing is centered against an annular shoulder 79 formed in connection with the hub structure 80 of the cutter spider 68, tapered rollers 80a being interposed between the races 77 and 78 in a manner resisting inwardly directed thrusts on the part of the cone and drill structure.

The hub structures 76 and 80 are united for rotation in unison by providing the hub structure 80 with a circular forwardly disposed flange 81, which carries in a rigid manner a plurality of radially disposed bolts 82, these bolts being received in openings provided in an annular flange 83 extending inwardly from the hub 76 of the cone and drill structure. The outer ends of the bolts 82 may be equipped with binding nuts 84. Dust-excluding and oil-retaining gaskets 85 are positioned between the flanges 81 and 83 and surround the bolts 82.

Intermediately of its length, the tubular hub 67 which carries and drives the spider member 68 is surrounded by a plain roller-type antifriction bearing 86. Dust-excluding and oil-retaining rings 87 are arranged in an annular space 88 formed between the hub 80 and the hub region 89 of the cap plate 43.

Antifriction bearings 90 of the needle type are shown as arranged between the inner end of the hub 67 and the shaft 69. Also, a thrust-receiving ball bearing 91 is arranged around the inner end of the shaft 69 and is confined between a face 92 of the housing section 41 and the inner end of the hub 67.

All these antifriction bearings provide for the free rotation of the revolving parts which they are required to support and, also, to resist inwardly directed longitudinally applied forces on such rotatable parts produced by the engagement of the cutting elements on the spider member 68 and the cone and drill parts 71 and 72.

Preferably, the spider member 68 is formed, as shown diagrammatically in Fig. 7, to include three radiating arms 92, 93 and 94, the first two of these arms, namely the arms 92 and 93, are of the same length, or have the tips of the cutters 95 positioned thereon disposed at the same distance from the axis of the gear 66 and its hollow shaft 67, said axis revolving about that of the sun gear 63 provided on the stationary spindle 61. The circular orbit of rotation of the planetary gears 64 and 66 about the axis of the gear 63 is indicated in Fig. 7 by the reference character 96. In Fig. 7, the heads are indicated as revolving in the directions disclosed by the arrows A. In Fig. 8, two cutting tool-carrying arms are indicated at 92 and *93* [19], and are employed in lieu of the three cutting arms illustrated in Fig. 7. In Fig. 9, a single cutting arm has been shown. It will be understood that any number of arms may be used, but two or three apparently offer the best patterns.

The arms 94 of the spider members 68, or the operating position of the cutters 95 thereon, are shorter in length or are arranged more closely to the axes of the gears 66 than is true of the arms 92 and 93 and the cutters carried thereby.

As a result of this arrangement, the cutters on the arms 92 and 93 each describe an elliptic pattern, the patterns of the arms 92 being indicated at B and those of the arms 93 at C, while the elliptic patterns of the cutters carried by the arms 94 are indicated at D. It will be observed that the patterns B and C of the dual cutting heads overlap each other centrally of the working face, so that the material cut and lowered by the machine leaves a working room which, broadly considered, is of sufficient width and height to accommodate standard mining equipment, such as trackways and wheeled machines or devices movable thereover. The fillets F and the cusps G may be left in place or readily removed by a manual operation, if desired, in producing flat bottom, roof and side walls in the room or passage produced in the mined coal seam by the machine of the present invention.

The cutters 95 on the outer ends of the arms 92, 93 and 94 produce kerfs, grooves or slots in the coal of sufficient depth so that in many instances the coal between such kerfs or within the confines thereof breaks up into loose bodies or lumps which drop upon the apron of the machine and are loaded by the conveyor 14 and 15 into mine cars. It is of advantage in certain types of coal to use the center drill 72 and the break-down cone 71. In certain coal seams, however, these elements need not be used.

The parallelogram levers or arms 22 enable the working heads of the machine to be adjusted vertically, adapting the cutters to seams varying in height. The telescopic shafts 20 furnish power to the revolving cutter heads from the relatively stationary frame of the machine in all working positions of vertical adjustment of said heads.

Figure 5:
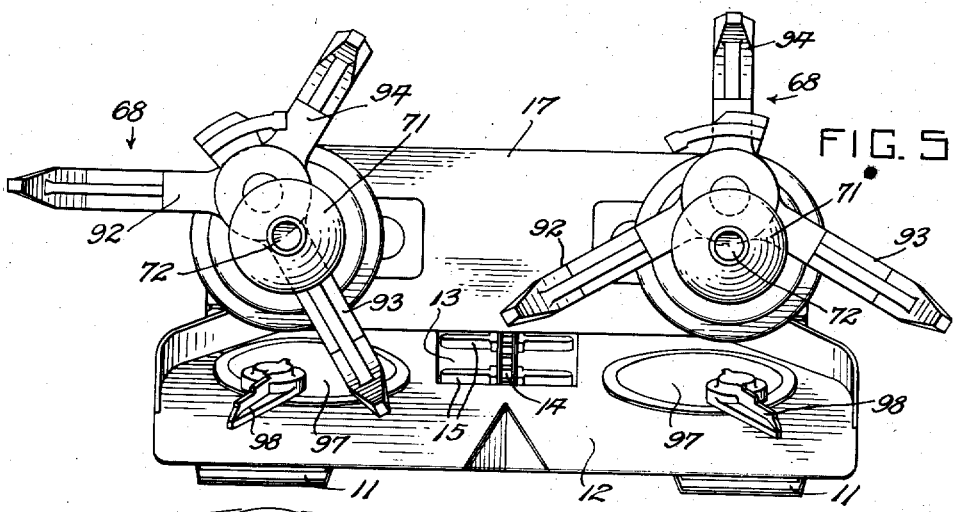
Fig. 5 is a front elevational view of the mining machine forming the present invention, disclosing its elliptically movable cutters, the material-receiving apron, and the gathering arms mounted on said apron.
Figure 6:
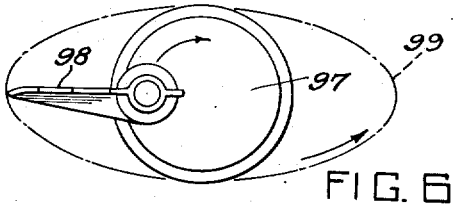
Fig. 6 is a diagrammatic view disclosing the elliptic path of movement of one of said gathering arms.

To facilitate the deposit of coal on the forward end of the loading conveyor indicated at 14 and 15, the upper surface of the apron 12 has mounted thereon, as shown in Figs. 5 and 6, especially, a pair of rotating disks 97. Each of the latter carries a gathering arm 98 which is movable in an elliptic path 99, the elliptic motion of the arm 98 being produced by the same type of planetary gearing as is employed in imparting similar motion to the spider members 68.

In this construction, the spider members and the cutters carried thereby rotate about their centers in directions opposite to the directions of rotation of the cranks producing the elliptical motion. Also, the cutter heads are mounted on the transversely disposed vertical bed plate for adjustment laterally of the machine and with respect to each other.

*From the foregoing description it will be noted that there has been disclosed a mining machine which comprises a supporting frame on which a cutter head is rotatably mounted and which head in turn has cutting tool-carrying means rotatably mounted on it to turn about an axis parallel with (and therefore laterally offset from) the axis of head rotation, drive means being provided and connected to rotate the head and drive means being pro-*

*vided for the tool-carrying means and connected to rotate the latter, concurrently with head rotation, in a direction to cause the tool-carrying means to describe a substantially elliptical pattern in a plane to which the axis of head rotation is perpendicular.*

*Again it will be noted that there is disclosed a mining machine comprising a supporting frame with a boring and disintegrating mechanism mounted thereon for forming a bore of elliptical cross section, said boring and disintegrating mechanism comprising an orbitally movable cutting tool having means for guiding and moving the same in a closed non-circular orbit which is the resultant of movement of said tool in a smaller closed orbit and concurrent movement of said last mentioned orbit, means for effecting movement of said tool in one direction in the smaller closed orbit during the boring operation, and means for continuously effecting during the boring operation rotation of said tool in the opposite direction about its own axis as it travels orbitally as aforesaid.*

*Further it will be noted that there is disclosed a mining mechanism in which there is a supporting frame bearing means carried by said frame, a cutting head revolubly supported by said bearing means, shaft means rotatably carried by said head in offset, spaced parallel relation to the axis of rotation of said head, cutting tool-carrying means carried by said head and extending laterally therefrom, drive means connected to revolve said head relative to said bearing means, and motion transmitting means carried by said head and drivingly connected to said shaft means and operable upon rotation of said head to impart to said tool-carrying means simultaneous bodily orbital movement in a circular pattern relative to said bearing means and rotation of said shaft means about its own axis in a direction to cause said tool-carrying means to describe a substantially elliptical pattern in a plane substantially perpendicular to the axis of rotation of said cutting head.*

*And still further it will be seen that there is disclosed a mining machine comprising a supporting frame and boring mechanism mounted on said frame for forming a bore of elliptical cross section in the mineral of a solid mine vein comprising an orbitally movable cutting tool having means for guiding and moving the same in a closed non-circular orbit, said guiding and moving means including a support rotatable about a horizontal axis on said frame and a second support carried by said rotatable support and rotatable relative thereto about a parallel axis in a direction opposite to the direction of rotation of said first support, and means for continuously effecting during the boring operation rotation of said tool concurrently in relatively opposite directions about said parallel axes.*

*It will further be seen that there is disclosed a mining machine for effecting the functions above specified and wherein means is provided for adjusting said supports for adapting the cutting tool to mine veins of varying thicknesses and by an interchange of different kinds of cutters to provide elliptical bores varying in size and shape. The moving means for the cutting tool may include a planet gear carried by said first support and a relatively stationary gear arranged with its axis coincident with the axis of rotation of said first support and with which said planet gear has a connection through which, when said first support is rotated, said second support is concurrently rotated through said planet gear.*

While I have set forth in detail a single preferred embodiment of a continuous mining and loading machine embodying my present invention, it is not to be understood that in so doing, I limit the invention to the precise structural details, combinations and part arrangements illustrated and described, since I reserve the right to employ all structural variations or modifications of my improved machine falling clearly within the spirit and scope of the following claims.

What is claimed is:

[1. In a mining machine, a supporting frame, a cutting head mounted on said frame, said head including stationary and rotatable casing sections, a stud member carried by said stationary section, a gear on said stud member, an idler planetary gear carried by the rotatable section of said head, the teeth of said last-named gear being in mesh with those of the stud member gear, an arm-carrying shaft rotatably supported in the rotatable section of said head in parallel relation to said stud member, a driven gear provided on said shaft for rotation therewith, said driven gear having the teeth thereof disposed in meshing engagement with those of said idler gear, and cutting means arranged exteriorly of said head and rotatable with said shaft.]

[2. In a mining machine, a supporting frame, a cutting head mounted on said frame, said head including stationary and rotatable casing sections, a stud member carried by said stationary section, a gear on said stud member, an idler planetary gear carried by the rotatable section of said head, the teeth of said last-named gear being in mesh with those of the stud member gear, an arm-carrying shaft rotatably supported in the rotatable section of said head in parallel relation to said stud member, a driven gear provided on said shaft for rotation therewith, said driven gear having the teeth thereof disposed in meshing engagement with those of said idler gear, and cutting means arranged exteriorly of said head and rotatable with said shaft, said cutting means being movable through an elliptic path of orbital travel.]

[3. A cutting head mechanism for mining machines comprising: a head casing including a relatively stationary base section and a rotatable housing section, a fixed axial member projecting from said base section and upon which said housing section is supported for rotation, internal gear teeth formed with said housing section, a power-driven gear supported by said base section having its teeth disposed in mesh with those of said internal gear, whereby to impart rotation to said housing section about said axial member, a sun gear provided stationarily on said axial member, an idler planetary gear rotatably carried by said housing section having teeth meshing with those of said sun gear, a shaft rotatably supported in said housing member in parallel relation to and at one side of said axial member, a driven gear fixed to rotate with said shaft, said driven gear having the teeth thereof disposed in meshing engagement with those of said idler gear, and a cutter-carrying arm member rotatably supporoted on an outer end of said shaft exteriorly of said housing member.]

[4. A cutting head mechanism for mining machines as defined in claim 3 and wherein said arm member is provided with cutters movable in elliptic orbital paths.]

[5. A cutting head mechanism for mining machines as defined in claim 3 and wherein the front of said arm member is disposed in axial registry with said shaft and beyond said housing section the said arm member is provided with a combined break-out cone and drill rotatable in unison with said arm member.]

[6. In a mining machine, a supporting head, a stationary stud member projecting from said head, a power-driven gear supported for rotation about the axis of said stud member, a stationary gear provided on said stud member, an idler gear rotatable with said power-driven gear, the teeth of said idler gear being in constant mesh with those of the stationary stud member gear, a shaft rotatably supported for movement around the circumference of said stationary gear and in unison with said power-driven gear, a driving gear mounted to rotate with said shaft, said driving gear having the teeth thereof disposed in meshing engagement with those of said idler gear, a cutter-carrying member rotatably supported on the outer end of said shaft exteriorly of said housing member, and cutter bits carried by said member, said bits being movable in elliptical orbital paths through the combined rotation of said shaft and the bodily rotational movement thereof about the circumference of said stationary gear.]

[7. In a mining machine, a supporting head, a stationary gear provided on said head, a power-driven gear rotatable about the axis of said stationary gear, an idler gear rotatable with said power-driven gear, the teeth of said idler gear being in constant mesh with those of the stationary gear, a shaft rotatably supported for movement around the circumference of said stationary gear and in unison with said power-driven gear, a driving gear fixed to rotate with said shaft, said driving gear having the teeth thereof disposed in constantly meshing engagement with those of said idler gear, a member rotatably supported on the outer end of said shaft, and cutting devices carried by said member in spaced radial relation to said shaft, said cutting devices being movable in elliptical orbital paths through the combined rotation of said shaft and bodily rotational movement thereof about the circumference of said stationary gear.]

[8. In a mining machine, a supporting frame, a stationary gear provided on said frame, a power-driven head supported for rotation on said frame about the axis of said stationary gear, an idler gear rotatable with said head, the teeth of said idler gear being in constant mesh with those of the stationary frame-mounted gear, a shaft rotatably supported by said head for movement around the circumference of said stationary gear and in unison with said head, a driving gear mounted to rotate with said shaft, said driving gear having the teeth thereof disposed in constant meshing engagement with those of said idler gear, and a material-engaging arm member rotatably supported on said shaft beyond said head, said member being movable in an elliptical orbit as a result of the combined rotation of the shaft on which it is mounted and the structural movement of said shaft about the circumference of said stationary gear.]

9. In a mining and loading machine, a portable base, *spaced apart kerf cutting means, and means for moving said kerf cutting means through overlapping elliptical paths comprising* a pair of cutter heads, each of said heads including stationary and rotatable sections, means for imparting rotation to the rotatable section of each of said heads to effect turning movement thereof, a stationary stud member projecting from each of the stationary sections of said heads and about the axis of which said rotatable sections concentrically revolve, a stationary sun gear on each of said stud members, an idler gear rotatable with each of said rotatable sections, said idler gear having teeth in constant mesh with those of said sun gear, a shaft rotatably mounted in each of the rotatable sections of said heads in parallel relationship with an associated stud member, a driving gear on each of said shafts having teeth in constant mesh with those of an associated idler gear, *said kerf cutting means including* a cutter supporting member carried by an outer end of each of said shafts exteriorly of said heads, each of said members including a plurality of *widely-angularly* spaced *narrow elongated* radially extending arms carrying kerf-cutting devices *at their outer portions*, the latter traveling in elliptical orbits *to form elliptical kerfs in the material being mined*, with the orbits of the cutting devices of one head overlapping those of the other.

10. A mining and loading machine as defined in claim 9, and wherein the *widely spaced* radial arms of said heads carrying said cutting devices are relatively disposed *to move in out-of-step relation* to avoid engagement *of the arms and devices of one of said heads* with the arms and devices of the other of said heads.

11. In a mining machine, a supporting frame, *a working face-cutting tool, and means carried by said frame for moving said cutting tool through an elliptical path including* a stationary spindle carried by said frame and projecting substantially horizontally therefrom, a cutting head revoluble about said spindle, said head including a housing formed with an internal gear, a power driven pinion having the teeth thereof in mesh with those of said internal gear, a stationary sun gear mounted on said spindle, an idler gear carried by and mounted within said housing and having the teeth thereof in mesh with those of said sun gear, a planet gear, *and* a quill rotatably supported by said housing and on which said planet gear is mounted, said quill being arranged in parallel radially offset order with respect to said spindle, an arm rotatable with said quill, *said* [and a] working face-cutting tool *being* carried by said arm and projecting forwardly therefrom.

[12. In a mining machine; a supporting frame; spindle means carried by said frame; a cutting head revoluble about said spindle means; shaft means rotatably carried by said head in offset, spaced parallel relation to the axis of rotation of said head; cutting tool-carrying means carried by said shaft means and extending laterally outwardly therefrom; drive means connected to revolve said head about said spindle; and motion-transmitting means carried by said head and drivingly connected with said shaft means and operable upon rotation of said head to impart to said shaft means simultaneous bodily orbiting movement in a circular pattern about said spindle means and axial rotation in a direction to cause the cutting tool-carrying means carried thereby to describe a substantially elliptical pattern in a plane substantially perpendicular to the axis of rotation of said cutting head.]

*13. A mining machine comprising a supporting frame, boring and disintegrating mechanism mounted on said frame for forming a bore of elliptical cross section in the mineral of a solid mine vein comprising an orbitally movable cutting tool having means including widely angularly spaced, narrow elongated cutter supporting arms for guiding and moving the cutters in an elliptical orbit which is the resultant of movement of said tool in a smaller closed orbit and concurrent movement of said last mentioned orbit, means for effecting movement of said tool carrying arms in one direction to cause the cutters to move in the smaller closed orbit during the boring operation, and means for continuously effecting movement of said arms during the boring operation to cause rotation of said tool in the opposite direction about its own axis as it travels orbitally as aforesaid, movement of said arms as aforesaid causing the cutters to trace an elliptical path to cut an elliptical bore as aforesaid.*

*14. In a mining machine, the combination comprising a support which is stationary as regards rotary motion, cutting mechanism comprising a single cutter arm carrying cutter means, a mechanism for driving said arm to cause said cutter means to trace an elliptical orbit having major and minor axes comprising means for mounting said cutter arm to move orbitally about a horizontal axis fixed relative to and extending longitudinally of said support, means for turning said cutter arm about its own axis of rotation in a direction opposite to the direction of such orbital movement, said arm axis being parallel with said fixed axis, and means for moving said arm axis orbitally about said fixed axis, said parallel axes being relatively close together at the central zone of the elliptical orbit of said cutter means with said fixed axis lying at the point of intersection of said axes of said elliptical orbit.*

*15. In a mining machine as set forth in claim 14 wherein said parallel axes, said cutter arm and said arm mounting means are so arranged that said cutter arm during its operating movement crosses over the axial line of said fixed axis as its own axis moves orbitally about said fixed axis.*

*16. In a mining machine, the combination comprising a support which is stationary as regards rotary motion, cutting means comprising a relatively short cutter arm and a longer cutter arm and cutter means carried by said arms respectively, and mechanism for driving said cutter arms to cause said cutter means to trace overlapping elliptical paths of relatively different size with their major axes rela-* tively inclined, the cutter means of said shorter arm tracing an elliptical orbit of smaller size than the elliptical orbit traced by said cutter means of said longer arm, said mechanism comprising means for mounting said cutter arms to move orbitally about a horizontal axis extending longitudinally of and fixed relative to said support, and means for turning said cutter arms in unison in a direction opposite to said direction of orbital movement about axes parallel with said fixed axis, and means for moving said axes of said arms orbitally about said fixed axis, said parallel axes being relatively close together at the central zone of the overlapping elliptical orbits of said cutter means.

17. A mining machine as set forth in claim 16 wherein said cutter arms, said parallel axes and said arm mounting means are so arranged that said cutter arms upon operating movement cross over the axial line of said fixed axis as the axes of rotation of said arms move orbitally about said fixed axis.

18. A mining machine as set forth in claim 16 wherein said overlapping elliptical orbits of different size have a common center coincident with said fixed axis.

19. In a mining machine, a combination comprising a support which is stationary as regards rotary motion, three angularly related cutter arms comprising an arm of shorter length than the others, each arm carrying cutting means, and mechanism for driving said arms to cause said cutter means to trace overlapping elliptical orbits, the orbit traced by said cutter means of said shorter arm being of different size from the orbits traced by said cutter means of said other arms, the cutter means of said shorter arm tracing an orbit of smaller size than the orbits traced by said longer arms, the major dimensions of said three orbits respectively extending in relatively different directions, said mechanism comprising means for mounting said cutter arms to cause their axes of rotation to move orbitally about a horizontal axis extending longitudinally of and fixed relative to said support, and means for turning said cutter arms in unison in a direction opposite to the direction of said orbital movement about axes parallel with said fixed axis, and means for moving said parallel axes of said arms orbitally about said fixed axis, said parallel axes being relatively close together at central zones of said overlapping elliptical orbits of said cutter means.

20. A mining machine as set forth in claim 19 wherein said three overlapping elliptical orbits have a common center coincident with said fixed axis.

21. In a mining machine, the combination comprising a non-rotatable support, parallel cutter heads mounted side by side on said support and spaced equidistantly from the longitudinal center of said support, each cutter head comprising a cutter arm carrying cutter means, and means for driving said cutter arms to effect cutting of elliptical overlapping bores in the mineral of a mine vein comprising for each head a member rotating about an axis fixed with respect to said support, means for mounting said arm on said member to revolve about an axis parallel with said fixed axis, said axes of said members being parallel and widely spaced at opposite sides of the longitudinal center of said support, means for rotating said member about said fixed axis to cause movement thereof in a circular orbital path about said fixed axis, and means for concurrently turning said arm about said parallel axis in a direction opposite to the direction of rotation of said member.

22. A mining machine as set forth in claim 21 wherein said rotating member, said arm, said parallel axes and said driving means are so arranged that said arm of each head upon operating movement crosses over the axial line of said fixed axis as the axis of rotation of said arm moves orbitally in said circular orbit about said fixed axis.

23. A mining machine as set forth in claim 21 wherein said fixed axes of said heads are horizontal and extend longitudinally of the machine, said fixed axes lying in a common horizontal plane and the axes of said cutter arms rotating in small circular orbits about said parallel fixed axes with each circular orbit lying in the central zone of the elliptical orbit traced by its associated cutter means.

24. A combination as set forth in claim 21 wherein each cutter head has an additional cutter arm of a length different from the length of said first mentioned cutter arm and with said arms moving orbitally in unison about said fixed axis, the shorter cutter arm having its cutter means tracing an elliptical orbit smaller than and overlapping with the ellipical orbit traced by the cutter means of the longer arm, with the major dimensions of said overlapping elliptical orbits extending in relatively different directions.

25. A mining machine as set forth in claim 23 wherein said cutter heads each have three cutter arms relatively widely angularly spaced with one arm of relatively different length from the others, and each arm carrying cutter means which upon driving of said head trace three differently spaced overlapping elliptical orbits with the major dimension of one orbit of relatively different length from the others, said three arms being integrally connected and moving in unison.

26. In a mining machine, the combination comprising a support, coacting cutter heads arranged side by side on said support and rotatable about parallel axes extending longitudinally of and fixed as regards orbital motion relative to said support, each head comprising a cutter arm rotatable about an axis parallel with said head axis and carrying cutter means, a member rotatable about the head axis to cause orbital motion of said arm axis in a circular path about said fixed head axis, means for rotating said member, and means for rotating said arm about said parallel axis in a direction opposite to the direction of rotation of said member, said heads when driven effecting movement of said cutter means in overlapping elliptical paths.

27. In a mining machine, the combination comprising a support, cutter heads mounted side by side on said support and spaced equidistantly from the longitudinal center of said support, each cutter head including a rotary member having its axis of rottaion fixed with respect to said support, a cutter arm carrying cutter means and mounted on said rotary member to turn about an axis parallel to said fixed axis, means for rotating said member, and means for rotating said cutter arm in a direction opposite to the direction of rotation of said member to cause said cutter means to trace an elliptical path, said cutter arm axis lying within the outer periphery of said rotary member near the central zone of said elliptical orbit, and said arm as it concurrently moves orbitally and rotates moving across the axial line of said fixed axis.

28. A cutting head mechanism for mining machines comprising: a plurality of cutters, and means for supporting said cutters for movement along an elliptical path and for moving said cutters comprising a head casing including a relatively stationary base section and a rotatable housing section, a fixed axial member projecting from said base section and upon which said housing section is supported for rotation, internal gear teeth formed with said housing section, a power-driven gear supported by said base section having its teeth disposed in mesh with those of said internal gear, whereby to impart rotation to said housing section about said axial member, a sun gear provided stationarily on said axial member, an idler planetary gear rotatably carried by said housing section having teeth meshing with those of said sun gear, a shaft rotatably supported in said housing section in parallel relation to and at one side of said axial member, a driven gear fixed to rotate with said shaft, said driven gear having the teeth thereof disposed in meshing engagement with those of said idler gear, and a plurality of widely angularly spaced, elongated arm members carrying said cutters and rotatably supported on an outer end of said shaft exteriorly of said housing section, said hous-

*ing section and said shaft as they rotate moving said arm members to cause said cutters to trace elliptical orbital paths.*

References Cited in the file of this patent or the original patent

UNITED STATES PATENTS

| | | |
|---|---|---|
| 458,868 | Van Depoele | Sept. 1, 1891 |
| 1,327,053 | London | Jan. 6, 1920 |
| 1,416,742 | Oldroyd | May 23, 1922 |
| 1,456,930 | Oldroyd | May 29, 1923 |
| 1,532,243 | Hebsacker | Apr. 7, 1925 |
| 1,582,247 | Burch | Apr. 27, 1926 |
| 1,603,621 | McKinlay | Oct. 19, 1926 |
| 2,062,657 | Joy | Dec. 1, 1936 |

| | | |
|---|---|---|
| 2,118,490 | Challacombe | May 24, 1938 |
| 2,281,503 | Levin | Apr. 28, 1942 |
| 2,384,397 | Ramsay | Sept. 4, 1945 |
| 2,404,605 | Thompson | July 23, 1946 |
| 2,520,040 | Levin | Aug. 22, 1950 |
| 2,528,748 | Greene | Nov. 7, 1950 |
| 2,546,899 | McCarthy | Mar. 27, 1951 |
| 2,684,234 | West | July 20, 1954 |

FOREIGN PATENTS

| | | |
|---|---|---|
| 2,790 | Great Britain | Aug. 13, 1874 |
| 290,349 | Great Britain | May 10, 1928 |
| 26,289 | France | June 12, 1923 |

(Addition to No. 536,000)